United States Patent [19]

Laroche

[11] Patent Number: 4,574,109

[45] Date of Patent: Mar. 4, 1986

[54] COMPOSITIONS INCORPORATING GLASS BEADS AND METHODS OF PREPARING THEM

[75] Inventor: Pierre Laroche, Nalinnes, Belgium

[73] Assignee: Glaverbel, Brussels, Belgium

[21] Appl. No.: 669,525

[22] Filed: Nov. 8, 1984

[30] Foreign Application Priority Data

Nov. 24, 1983 [GB] United Kingdom ............... 8331375

[51] Int. Cl.$^4$ ..................... B32B 27/14; B32B 5/16
[52] U.S. Cl. ................................ 428/325; 428/331; 428/403; 428/405; 428/406
[58] Field of Search ............... 428/405, 406, 325, 403, 428/331

[56] References Cited

U.S. PATENT DOCUMENTS 3,769,126 10/1973 Kolek .................................. 428/325
4,268,069 5/1981 Stolfo .................................. 428/331

FOREIGN PATENT DOCUMENTS

WO81/00031 8/1981 PCT Int'l. Appl. .
1163318 9/1969 United Kingdom ............... 428/406

Primary Examiner—Paul J. Thibodeau
Attorney, Agent, or Firm—Spencer & Frank

[57] ABSTRACT

The invention provides a composition comprising an intimate mixture of glass beads and finely divided material, characterized in that the glass beads have a mean diameter of not more than 80 micrometers and a size range spread which is at least half the mean diameter of the beads, and in that said finely divided material is hydrophobic, inorganic and substantially chemically inert with respect to the beads and has a specific surface of at least 50 m$^2$/g, such material being present in said mixture in an amount not exceeding 5% by weight of the beads.

The surfaces of the beads may be treated with an agent which improves adherence between the beads and a resin matrix, e.g. an agent such that the surfaces of the beads include organo-silane groups.

The finely divided material preferably has a specific surface of at least 100 m$^2$/g, and may substantially entirely consist of silica.

23 Claims, No Drawings

4,574,109

COMPOSITIONS INCORPORATING GLASS BEADS AND METHODS OF PREPARING THEM

BACKGROUND OF THE INVENTION

This invention relates to compositions incorporating glass beads.

Glass beads are widely used as fillers for plastics materials, for example for increasing the hardness of the product formed from the particular plastics material being used. It is in some cases desirable to vary the amount of filler in plastics material for different products.

In particular it is often desirable for economic reasons to introduce as high a proportion of filler into the plastics materials as possible. This can present problems in that decreasing the proportion of fluid plastics resin will in general increase the viscosity of the resin-bead mixture, with the result that viscosity requirements which are imposed by the plastics shaping process to be used will in effect impose an upper limit on the proportion of filler which may be used. In particular, where the glass beads to be used as filler have a relatively low bulk settled density, the viscosity of the resin-bead mixture rises sharply with increasing concentrations of beads.

It is a principal object of the present invention to provide a composition incorporating glass beads which may be used as a filler for plastics material in varying proportions without having such a great effect on the viscosity of the resin-bead mixture.

SUMMARY OF THE INVENTION

According to the present invention, there is provided a composition comprising an intimate mixture of glass beads and finely divided material, characterised in that the glass beads have a mean diameter of not more than 80 micrometers and a size range spread which is at least half the mean diameter of the beads, and in that said finely divided material is hydrophobic, inorganic and substantially chemically inert with respect to the beads and has a specific surface of at least 50 m$^2$/g, such material being present in said mixture in an amount not exceeding 5% by weight of the beads.

The expression "mean diameter" is used herein in the sense that 50% of the beads have a diameter greater than the mean and 50% a lesser diameter.

Such a mixture is useful as a filler for plastics materials. It has been found that when small proportions of said finely divided material are added to the glass beads of such a size and size range spread this has a significant effect in increasing the bulk settled density of the mixture and that this is favourable for reducing variations in the viscosity of a resin-bead mixture with variations in the proportion of beads incorporated.

DESCRIPTION OF THE PREFERRED EMBODIMENTS

In preferred embodiments of the invention, the surfaces of the beads have been treated with an agent which improves adherence between the beads and a resin matrix. For example it is preferred that the surfaces of the beads include organo-silane groups. By appropriate choice of organo-silane, this improves wetting of the beads by the fluid resin and so can impart improved properties to a product made from plastics material filled with such beads.

It is known per se to modify the surfaces of glass beads in order to promote adherence between them and a resin matrix. A common way of doing this has been to immerse the beads in a bath containing a solution (e.g. in water and/or alcohol) of the desired treatment agent. However it has been found that when glass beads were treated in this way, even when the bath was strongly agitated, the beads were not evenly treated, thus leading to a product of non-uniform quality. It has surprisingly been found that this problem is substantially overcome when a composition according to the invention is so treated, and the present invention accordingly includes a method of modifying the surface properties of glass beads in which a composition is formed which substantially entirely consists of glass beads intimately mixed with a finely divided material which is hydrophobic, inorganic and substantially chemically inert with respect to the beads and which has a specific surface of at least 50 m$^2$/g in an amount not exceeding 5% by weight of the beads, the glass beads having a mean diameter of not more than 80 micrometers, and a size range spread which is at least half the mean diameter of the beads, and the composition is then treated with a treatment agent which modifies the surfaces of the beads to improve adherence between the beads and a resin matrix.

The advantages afforded by the present invention are particularly manifest when the glass beads are small, and it is accordingly preferred that the mean diameter of the beads does not exceed 65 micrometers. Preferably, at least 80% by weight of the beads have a diameter less than 44 micrometers.

As has been stated, it has been found that the incorporation of said finely divided material affords an increase in the bulk settled density of the glass beads. In preferred embodiments of the invention, the bulk settled density of the mixture is between 55% and 80% of the density of the glass from which the beads are formed.

The efficacy of said finely divided material is promoted when it has a specific surface of at least 100 m$^2$/g as is preferred.

Various finely divided materials may be used, but it is especially preferred that such finely divided material substantially entirely consists of silica.

Finely divided silica having the required properties is commercially available from Degussa (Frankfurt) under their Trade Mark AEROSIL and from Cabot Corporation (Tuscola, Ill.) under their Trade Mark CAB-O-SIL.

Said finely divided material is preferably present in said composition in an amount of at least 0.02% by weight of the beads. It is in general not necessary to use more than 0.2% finely divided material by weight of the beads, and for economy it is preferred that said finely divided material be present in an amount not more than 0.1% by weight of the beads.

Treatment of the beads in order to promote adherence between them and a resin matrix is preferably carried out using a treatment agent which comprises a silane composition. It has been found that such a silane treatment is most effective when carried out in a solution having a pH in the range 4.5 to 6.5.

The invention includes a composition comprising glass beads which have been treated by a method as herein defined and extends to polymeric material incorporating as filler a composition according to the invention.

There now follow certain specific Examples of the present invention.

EXAMPLE 1

Soda lime glass beads were formed with a mean diameter of 64.7 micrometers. The upper decile diameter was 96.7 micrometers. That is, 10% of the beads had a diameter greater than 96.7 micrometers. The lower decile diameter was 42 micrometers.

The bulk settled density of these beads was 1.47 T/m$^3$, the soda lime glass from which they were formed having a density of 2.46 T/m$^3$.

The beads were intimately mixed with 0.1% by weight of finely divided material to form a composition according to the present invention. The finely divided material used was a hydrophobic silica having a specific surface of 120 m$^2$/g commercially available under the Trade Mark AEROSIL R 972.

The bulk settled density of the mixture was 1.62 T/m$^3$.

This composition was then mixed with PALATAL KR5203 (Trade Mark) polyester resin in an amount 300 parts per hundred parts resin by weight. The viscosity of the resin-bead mixture was 22 Pas. By way of comparison, if the glass beads alone were mixed with the resin, then only 230 parts per hundred parts resin by weight could be added for the same viscosity.

EXAMPLES 2 AND 3

A batch of glass beads having a mean diameter of less than 80 micrometers, a size range spread of more than half the mean diameter and a bulk settled density of 1.77 T/m$^3$ was divided into two like samples.

These two samples, Examples 2 and 3, were intimately mixed with finely divided hydrophobic silica commercially available under the Trade Mark CAB-O-SIL N70-TS in an amount of 0.15% by weight of the beads. The silica had a specific surface of 70 m$^2$/g. The bulk settled density of these compositions was 1.97 T/m$^3$.

The second of these samples (Example 3) was then subjected to a silanisation treatment by reacting the beads with an amino-silane in an amount of 0.5 g silane per kg beads in a solution having a pH between 4.5 and 6.5. The bulk settled density of the resulting product was 1.92 T/m$^3$.

These two samples were then incorporated in various proportions into a resin mixture comprising 100 parts by weight epoxy to 35 parts amine. The filled resin was formed into billets of substantially identical size and these were tested for tensile strength, elongation at break and and resistance to flexure immediately after curing and after artificial aging by boiling in water for periods of 24, 48 and 72 hours.

Some results are given in the following tables in which figures for tensile strength and resistance to flexure are given in kg/cm$^2$, and tensile strength and elongation are indicated at break.

TABLE 1

| (200 parts by weight filler per 100 parts resin) | | | | | |
|---|---|---|---|---|---|
| | | Boiling time (hours) | | | |
| | | 0 | 24 | 48 | 72 |
| Example 2 | Tensile strength | 280 | 138 | 139 | 140 |
| | Elongation (%) | 4 | 6 | 9 | 8 |
| | Flexure resistance | 452 | 279 | 242 | 224 |
| Example 3 | Tensile strength | 384 | 298 | 231 | 133 |
| | Elongation (%) | 9 | 6.5 | 7 | 9 |
| | Flexure resistance | 625 | 465 | 325 | 321 |

TABLE 2

| (300 parts by weight filler per 100 parts resin) | | | | | |
|---|---|---|---|---|---|
| | | Boiling time (hours) | | | |
| | | 0 | 24 | 48 | 72 |
| Example 2 | Tensile strength | 234 | 101 | 95 | 109 |
| | Elongation (%) | 3 | 7 | 9 | 9 |
| | Flexure resistance | 338 | 197 | 162 | 145 |
| Example 3 | Tensile strength | 396 | 311 | 238 | 234 |
| | Elongation (%) | 9 | 5 | 5 | 5 |
| | Flexure resistance | 716 | 492 | 379 | 309 |

TABLE 3

| (400 parts by weight filler per 100 parts resin) | | | | | |
|---|---|---|---|---|---|
| | | Boiling time (hours) | | | |
| | | 0 | 24 | 48 | 72 |
| Example 2 | Tensile strength | 222 | 76 | 76 | 72 |
| | Elongation (%) | 1.7 | 5 | 6 | 8 |
| | Flexure resistance | 314 | 140 | 116 | 112 |
| Example 3 | Tensile strength | 345 | 313 | 247 | 213 |
| | Elongation (%) | 6 | 4 | 4 | 4 |
| | Flexure resistance | 651 | 466 | 339 | 255 |

I claim:

1. A composition comprising an intimate mixture of glass beads and finely divided material, wherein the glass beads have a mean diameter of not more than 80 micrometers and a size range spread which is at least half the mean diameter of the beads, and wherein said finely divided material is hydrophobic, inorganic, substantially chemically inert with respect to the beads, has a specific surface of at least 50 m$^2$/g, and is present in said mixture in an effective amount not exceeding 5% by weight of the beads, whereby the bulk settled density of the mixture is greater than that of the glass beads alone and greater quantities of said composition can be incorporated in a specific amount of polymer resin for any selected viscosity than the quantity of glass beads alone which results in that viscosity.

2. A composition according to claim 1, wherein the surfaces of the beads have been treated with an agent which improves adherence between the beads and a resin matrix.

3. A composition according to claim 2, wherein the surfaces of the beads include organo-silane groups.

4. A composition according to claim 1, wherein the mean diameter of the beads does not exceed 65 micrometers.

5. A composition according to claim 4, wherein at least 80% by weight of the beads have a diameter less than 44 micrometers.

6. A composition according to claim 1, wherein the bulk settled density of the mixture is between 55% and 80% of the density of the glass from which the beads are formed.

7. A composition according to claim 1, wherein said finely divided material has a specific surface of at least 100 m$^2$/g.

8. A composition according to claim 1, wherein said finely divided material consists essentially of silica.

9. A composition according to claim 1, wherein said finely divided material is present in an amount of at least 0.02% by weight of the beads.

10. A composition according to claim 1, including a polymer resin.

11. A composition according to claim 10, wherein the polymer resin is selected from the group consisting of polyester resin and epoxy resin.

12. A composition according to claim 11, wherein the surfaces of the beads include organo-silane groups.

13. A composition according to claim 1 wherein the mixture of glass beads and finely divided material has been reacted with a treatment agent so as to modify the surfaces of the beads and improve adherence between the beads and a resin matrix.

14. Polymeric material incorporating as filler a composition according to claim 1.

15. A method of modifying the surface properties of glass beads in a composition which consists essentially of glass beads intimately mixed with a finely divided material which is hydrophobic, inorganic and substantially chemically inert with respect to the beads and which has a specific surface of at least 50 m$^2$/g in an effective amount not exceeding 5% by weight of the beads, the glass beads having a mean diameter of not more than 80 micrometers, and a size range spread which is at least half the mean diameter of the beads, comprising intimately mixing the glass beads with the finely divided material to form a composition, and treating the composition by reacting with a treatment agent which modifies the surfaces of the beads to improve adherence between the beads and a resin matrix whereby the bulk settled density of the mixture is greater than that of the glass beads alone.

16. A method according to claim 15, wherein said treatment agent comprises a silane composition.

17. A method according to claim 16, wherein said silane treatment is carried out in a solution having a pH in the range 4.5 to 6.5.

18. A method according to claim 15, wherein the glass beads have a mean diameter not exceeding 65 micrometers.

19. A method according to claim 15, wherein at least 80% by weight of the beads have a diameter less than 44 micrometers.

20. A method according to claim 15, wherein the bulk settled density of the composition is between 55% and 80% of the density of the glass from which the beads are formed.

21. A method according to claim 15, wherein the finely divided material has a specific surface of at least 100 m$^2$/g.

22. A method according to claim 15, wherein the finely divided material consists essentially of silica.

23. A method according to claim 15, wherein the finely divided material is present in an amount of at least 0.02% by weight of the beads.

* * * * *